Nov. 19, 1929.  P. SCHÜTTLER  1,736,670
OSCILLATION ABSORBER FOR LEAF SPRINGS
Filed Nov. 17, 1926
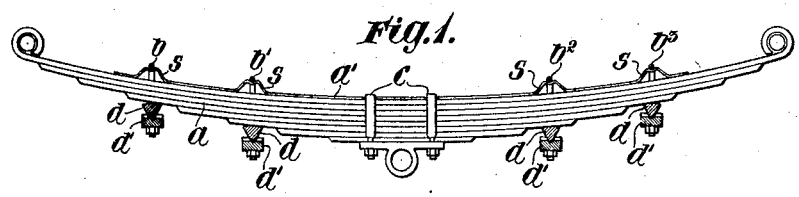
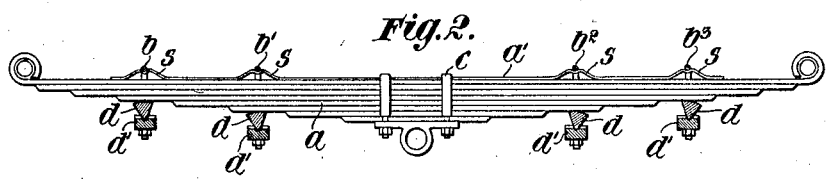
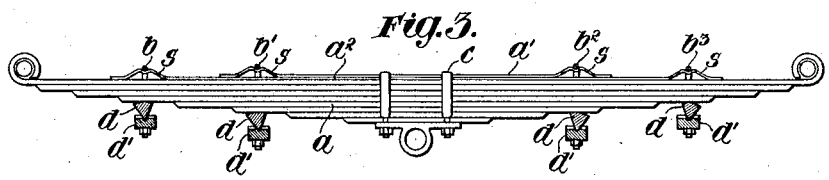
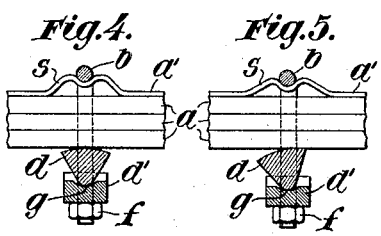
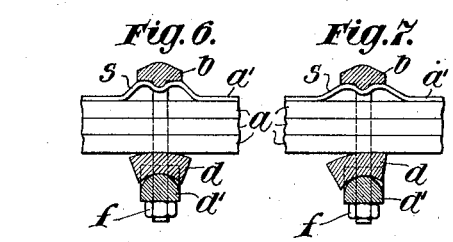
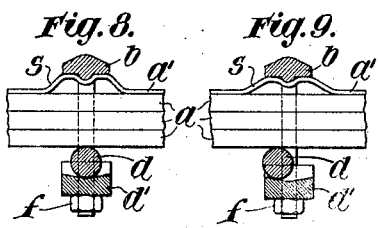
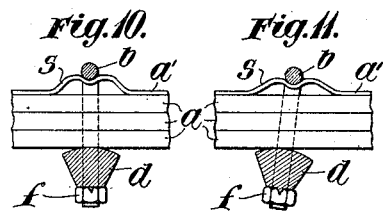
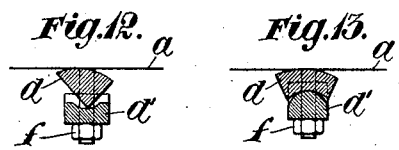
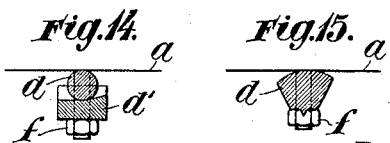
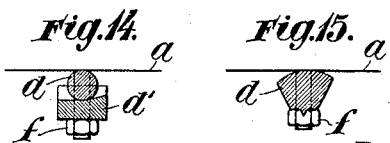
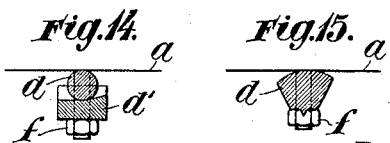
Inventor
Paul Schüttler
By William C. Linton
Attorney.

Patented Nov. 19, 1929

1,736,670

UNITED STATES PATENT OFFICE

PAUL SCHÜTTLER, OF CHARLOTTENBURG, GERMANY

OSCILLATION ABSORBER FOR LEAF SPRINGS

Application filed November 17, 1926, Serial No. 148,918, and in Germany November 28, 1925.

This invention relates to an oscillation absorber for leaf springs, more particularly of automobile vehicles with absorption of the oscillation of the spring suspension during the progress of the oscillation. The new oscillation absorber enables the damping of the spring to be effected progressively, so that a damping action becomes operative in proportion to the deflection of the spring, in which case moreover the damping of the spring may be restricted progressively or constantly to one only of the movements of the spring, to the upward movement for example, or else to the downward movement.

The invention is illustrated diagrammatically and by way of example on the accompanying drawing on which Figure 1 is a sideview of an automobile vehicle spring provided with an oscillation absorber designed according to this invention; Figure 2 shows the same spring in depressed state; Figure 3 shows a modification; Figures 4 and 5 show details of Figs. 1 and 2, as well as of Fig. 3 drawn to an enlarged scale, and Figs. 6 and 7, 8 and 9, 10 and 11, 12 and 13, and 14 and 15, show modifications of the details shown in Figs. 4 and 5, all drawn to the same scale as these latter figures.

The apparatus consists, according to Figures 1 to 3 of the accompanying drawings, of a spring plate $a'$, which is supplementary in relation to the spring leaves $a$, which are held together in a known manner at $c$ and which is bent up at the positions $s$ in such a manner that these positions are operative as compression springs. Instead of the arrangement provided in Figures 1 to 2, of only one supplementary plate $a$, to which the spring bridles are attached, it is also possible to employ, according to Figure 3, two supplementary spring plates, $a'$, $a^2$, each of which is equipped with one or more spring bridles. $b$, $b^1$, $b^2$ and $b^3$ denote spring bridles which prevent the lateral displacement of the spring plates in the manner of the known spring stirrups. They are not provided at their ends, which are provided with clamping screws $f$, with the usual fastening bridges, as hitherto, but are specially constructed in such a way that both during the upward swing and during the downward swing of the spring suspension, or during one only of these two swinging movements, the friction of the individual spring plates is increased or diminished according to their flexure and therefore according to their relative displacement, as illustrated in Figures 4 and 5.

When the end of the spring suspension bends, its individual leaves are displaced relatively to one another, in which case, in consequence of the displacement of the lowermost spring $a$, the rolling body $d$ acting in the manner of a wedge, and pressed by the spring bridle $b$, through the medium of the stirrup, against the spring, is carried along with the spring plate by friction thereon. It accordingly swings about the point $g$ of the support $d'$, and assumes the position diagrammatically illustrated in Figure 5. The supplementary spring plate $a'$, thus undergoes at the points $s$ a flexure, from which it follows that the application pressure which the rolling body exerts against the lowermost plate $a$ increases in proportion as the displacement of the spring plates relative to one another increases. With the application pressure of $d$ there also increases the friction of the other spring leaves $a$, and accordingly also the intrinsic damping of the spring. The apparatus therefore works both during the upward swing and during the downward swing of the spring suspension progressively about its zero position, increasing the friction of the individual spring plates against one another in proportion as the flexure of the spring suspension or the displacement of the individual leaves of the spring relative to one another increases.

Figures 6 to 7 show the same apparatus with the distinction that the spring bridle $b$ is equipped with a specially shaped head, while the rolling body $d$, instead of rolling upon a concave path, rolls upon a convex path $d$.

Figures 8 and 9 show the same apparatus employing a roller $d$ serving as a rolling body, which rolls upon a suitable curved path $h$.

In Figures 10 and 11 is shown a rolling body $d$ which bears directly against the nut $f$.

Finally, Figures 12 to 15 show rolling bodies $d$, $d'$ in the case of which the rolling curve is so shaped that the oscillations of the spring suspension are only damped in one direction, either during the downward or during the upward movement, by increasing the friction of the spring plates.

The action may be caused to operate at will upon the downward movement, as well as upon the upward movement according as the rolling body brings its rising curve into operation upon the spring.

I claim:

1. A device of the character described comprising in combination with a vehicle spring, a supplementary spring plate mounted with the vehicle spring, said plate being formed at a plurality of points into compression springs, bridles surrounding the vehicle spring and supplementary plate and having one of their ends in engagement with the compression springs formed upon said supplementary plate, and a rolling body interposed between the free end of said bridles and the vehicle spring.

2. A device of the character described comprising in combination with a vehicle spring, a supplementary spring plate mounted upon the upper side of the vehicle spring, said plate being formed at a plurality of points into compression springs, bridles surrounding the vehicle spring and supplementary plate and in engagement with the compression spring formed on the latter, the free end of said bridles projecting beyond the lower portion of the vehicle spring, and a rolling body carried by the projected free end of said bridles and continuously urged into frictional contact with the under side of the vehicle spring.

3. A device of the character described comprising in combination with a vehicle spring, a supplementary spring plate mounted with the vehicle spring and having compression means formed therewith, calmping means on said spring and rockably engaging the compression means of said supplementary spring plate, and a rolling body carried by said clamping means into frictional contact with the vehicle spring.

4. A device of the character described comprising in combination with a vehicle spring, a supplementary spring plate mounted with the vehicle spring and having compression means formed therewith, clamping means in engagement with the compression means of said supplementary spring plate and encircling the vehicle spring, and a body supported and held in contact with portions of the vehicle spring by said clamping means, said body being adapted through action of the compression means of the supplementary spring plate to have a wedging effect upon the vehicle spring with flexing of the same.

In witness whereof I have hereunto set my hand.

PAUL SCHÜTTLER.